United States Patent
Joubert et al.

(10) Patent No.: US 8,812,385 B2
(45) Date of Patent: Aug. 19, 2014

(54) ALTERABLE ACCOUNT NUMBER

(71) Applicants: Bob Joubert, Makati (PH); Vikram Modi, Laguna Green (SG); Shantnu Singh, Singapore (SG); Kenneth Cheng, Kowloon (HK); Mennie Co So, Paranaque (PH)

(72) Inventors: Bob Joubert, Makati (PH); Vikram Modi, Laguna Green (SG); Shantnu Singh, Singapore (SG); Kenneth Cheng, Kowloon (HK); Mennie Co So, Paranaque (PH)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/714,045

(22) Filed: Dec. 13, 2012

(65) Prior Publication Data

US 2013/0144787 A1 Jun. 6, 2013

Related U.S. Application Data

(62) Division of application No. 12/683,118, filed on Jan. 6, 2010.

(60) Provisional application No. 61/177,049, filed on May 11, 2009.

(51) Int. Cl.
*G06Q 40/00* (2012.01)
*G06Q 20/10* (2012.01)

(52) U.S. Cl.
CPC ................................ *G06Q 20/105* (2013.01)
USPC .................. 705/35; 705/39; 705/44

(58) Field of Classification Search
CPC ......... G06Q 20/105; G06Q 40/02; G07F 7/08
See application file for complete search history.

(56) References Cited

U.S. PATENT DOCUMENTS

| | | |
|---|---|---|
| 4,885,779 A | 12/1989 | Roberts et al. |
| 5,479,494 A | 12/1995 | Clitherow |
| 5,578,808 A | 11/1996 | Taylor |
| 5,746,451 A | 5/1998 | Weyer |
| 6,227,447 B1 | 5/2001 | Campisano |
| 6,341,724 B2 | 1/2002 | Campisano |
| 2002/0147679 A1 | 10/2002 | Tardif |
| 2003/0154375 A1 | 8/2003 | Yang |

(Continued)

FOREIGN PATENT DOCUMENTS

| | | |
|---|---|---|
| KR | 2003 0050576 A | 6/2003 |
| WO | 2009/020856 A1 | 2/2009 |

OTHER PUBLICATIONS

Copy of Search/Examination Report dated Nov. 26, 2010 from International Patent Application No. PCT/US2010/033477 filed May 4, 2010, 9 pages.

European Search Report dated May 7, 2013 in related European Patent Application No. 10775266.9, filed May 4, 2010, 7 pages.

(Continued)

*Primary Examiner* — William Rankins

(74) *Attorney, Agent, or Firm* — Kilpatrick Townsend & Stockton LLP

(57) ABSTRACT

Embodiments of the invention are directed to apparatuses, systems, and methods that allow for personalized data to be embedded in a primary account number associated with a consumer device. In one embodiment, a consumer device comprises a body and personalized data embedded into a primary account number, associated with the body. The primary account number includes a bank identification number and the bank identification number and the personalized data overlap.

16 Claims, 8 Drawing Sheets

(56) References Cited

U.S. PATENT DOCUMENTS

| | | | |
|---|---|---|---|
| 2004/0249734 A1* | 12/2004 | Benito et al. | 705/35 |
| 2007/0136193 A1* | 6/2007 | Starr | 705/41 |
| 2007/0203715 A1 | 8/2007 | Kane | |
| 2007/0208671 A1 | 9/2007 | Brown et al. | |
| 2008/0000965 A1 | 1/2008 | Zellner et al. | |
| 2008/0065553 A1 | 3/2008 | Faith et al. | |
| 2008/0067256 A1 | 3/2008 | Shernaman | |
| 2008/0317240 A1 | 12/2008 | St Pierre et al. | |
| 2009/0234772 A1 | 9/2009 | Van Rensburg et al. | |

OTHER PUBLICATIONS

Office Action dated Dec. 5, 2012 in Australian Patent Application No. 2010247994 filed May 4, 2010, 5 pages.

US Office Action dated Feb. 16, 2012 in U.S. Appl. No. 12/683,118, filed Jan. 6, 2010, 19 pages.

US Office Action dated Jul. 12, 2012 in U.S. Appl. No. 12/683,118, filed Jan. 6, 2010, 30 pages.

US Office Action dated Jul. 18, 2013 in U.S. Appl. No. 12/683,118, filed Jan. 6, 2010, 15 pages.

* cited by examiner

ALTERABLE ACCOUNT NUMBER

CROSS-REFERENCES TO RELATED APPLICATIONS

The present application is a divisional of and claims priority to U.S. Non-Provisional application Ser. No. 12/683,118, filed Jan. 6, 2010, which claims priority to Provisional Application No. 61/177,049, filed on May 11, 2009, the entire contents of which are herein incorporated by reference for all purposes.

BACKGROUND

For most consumers it is difficult to remember the 16-digit account number associated with their credit cards, debit cards, prepaid cards and the like. In addition, it is difficult to remember the account number of another person such as a beneficiary of a money transfer (e.g., a consumer's teenage son). The fact that a consumer does not have an account number memorized can be inconvenient for the consumer and problematic for the issuer or entity associated with the credit card in many instances. For example, a consumer may have a prepaid card or account associated with a mobile phone. This prepaid card or account may be a physical or a virtual card or account. The consumer may only have a few minutes of talk time left before his account runs out and thus wants to transfer money to add value to that prepaid card or account. If the consumer has not memorized his account number or does not have it handy, it would be inconvenient for a consumer to have to wait and look for his card or call the issuer of the card or account to add value to that card or account. As a result, the consumer may no longer be able to make calls on his mobile phone because his account is depleted or may use the mobile phone less frequently. Thus, a solution is needed to help make it easier for consumers to remember and access the primary account number (PAN).

Embodiments of the invention address the above problem and other problems individually and collectively.

BRIEF SUMMARY

Embodiments of the invention are directed to apparatuses, systems, and methods that allow for personalized data to be embedded in a primary account number associated with a consumer device.

One embodiment of the invention is directed to a consumer device (e.g., a credit card) comprising a body such as a substrate or housing, and personalized data embedded into a primary account number, associated with the body. The primary account number includes a bank identification number and the bank identification number and the personalized data overlap. For example, an account number might include a BIN or bank identification number "23456" and the number "6" may start a data string associated with a consumer's telephone number.

Another embodiment of the invention is directed to a consumer device comprising a body, and personalized data embedded into a primary account number, associated with the body. The primary account number includes a type-length-value (TLV) element. For example, in a TLV format, "1" may represent a phone number (a type), "10" may relate to the number of digits in the phone number (a length), and the phone number "555-555-5555" may correspond to a value.

Another embodiment of the invention is directed to a method comprising receiving a request for a personalized primary account number associated with an account. The request includes personalized data to be embedded into a primary account number. The method further comprises determining whether the personalized primary account number is available to be associated with an account, and approving the personalized primary account number, if the personalized account number is available to be associated with the account. The personalized primary account number includes a bank identification number and the bank identification number and the personalized data overlap.

Another embodiment of the invention is directed to a method comprising receiving a request for a personalized primary account number associated with an account. The request includes personalized data to be embedded into a primary account number. The method further comprises determining whether the personalized primary account number is available to be associated with an account, and approving the personalized primary account number, if the personalized account number is available to be associated with the account. The personalized primary account number includes a type-length-value element.

Another embodiment of the invention is directed to a method comprising receiving an authorization request message. The authorization request message contains a personalized primary account number. The method further comprises determining whether the personalized primary account number contains alpha-numeric values, and converting the alpha-numeric values to numeric values if the personalized primary account number contains alpha-numeric values.

These and other embodiments of the invention are described in further detail below.

DETAILED DESCRIPTION

Embodiments of the invention allow for personalized data to be embedded in a primary account number (PAN) for an account number associated with a consumer device. The user can use the account number for purchases, money transfers, and other transactions.

Personalized data that can be embedded in the PAN can include any data (e.g., numeric, alpha, alpha-numeric) that is meaningful to the consumer. For example, a consumer would be able to use his or her phone number, a memorable date (e.g., birth date, an anniversary date, etc.), zip code, national service number, company or government identification, address, a name or word translated into numbers, a social security number, a tax file number, a name, a short message, auspicious or lucky numbers, etc. to personalize his account number.

To create a personalized account number, the consumer would contact the issuer of the account number via phone, in writing, or online such as via a web site. For example, a consumer could go to a website provided by the issuer or an entity associated with the issuer to insert information and request a particular account number (e.g., that includes the consumer's birthday). The consumer could submit the request and the issuer could respond (immediately or at a later time) with the new account number.

If a consumer device stores the PAN, the consumer could use the consumer device just like a regular credit card, debit card, or prepaid card if it is in the form of a card. The consumer could also transfer money to and from the consumer device if the consumer device is capable of storing value.

Additional details regarding embodiments of the invention are described below.

The consumer device may be in any suitable form. For example, suitable consumer devices can be hand-held and compact so that they fit into a consumer's wallet and/or pocket (e.g., pocket-sized). They may include smart cards, ordinary credit or debit cards (with a magnetic strip and without a microprocessor), keychain devices (such as the Speedpass™ commercially available form Exxon-Mobil Corp.), etc. Other examples of consumer devices include cellular phones, PDAs, pagers, payment cards, security cards, access cards, smart media, transponders, and the like. The consumer devices can also be debit services (e.g., a debit card), credit devices (e.g., a credit card), or stored value devices (e.g., a stored value card). The consumer device could also be in the form of a virtual account.

Figure 8A:
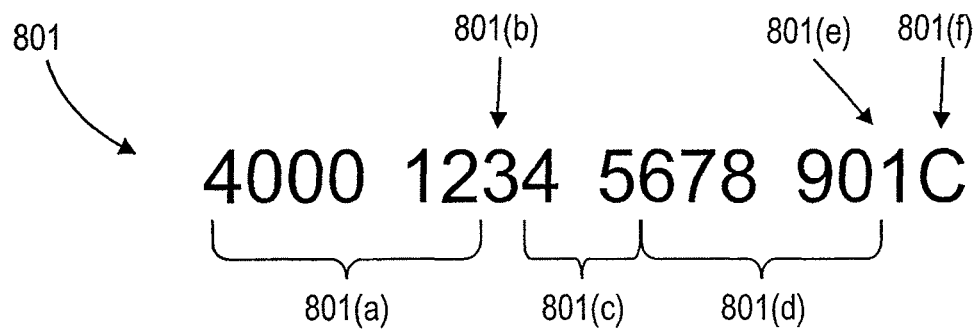
FIG. 8A shows an exemplary primary account number according to an embodiment of the invention.

Typically a PAN 801 for a consumer device such as a credit card, includes several parts as shown in FIG. 8A. The first few digits 801(a) may be a bank identification number (BIN) which can be four to six digits. The BIN identifies the institution associated with the card (e.g., Visa, MasterCard, Discovery Card, American Express, etc.). This number is used to identify the issuer of the consumer device. The next digit 801(b) may be a free or spare digit. The next two digits 801(c) may be a product code. The next several digits 801(d) may be a running serial number. The next digit 801(e) may be an add-on card. The final digit 801(f) may be a check digit which is a value derived from the previous digits in the PAN.

Figure 8B:
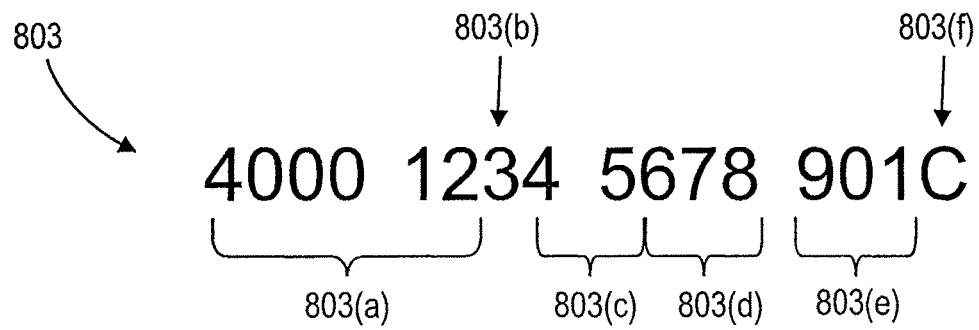
FIG. 8B shows an exemplary primary account number according to an embodiment of the invention.

Typically a PAN 803 for a consumer device such as a debit card includes several parts as shown in FIG. 8B. The first few digits 803(a) may be a BIN which can be four to six digits. The next digit 803(b) may be a free or spare digit. The next two digits 803(c) may be a product code. The next several digits 803(d) may be a running serial number. The next few digits 803(e) may be an add-on card. The final digit 801(f) may be a check digit which is derived from the previous digits in the PAN.

Figure 1A:
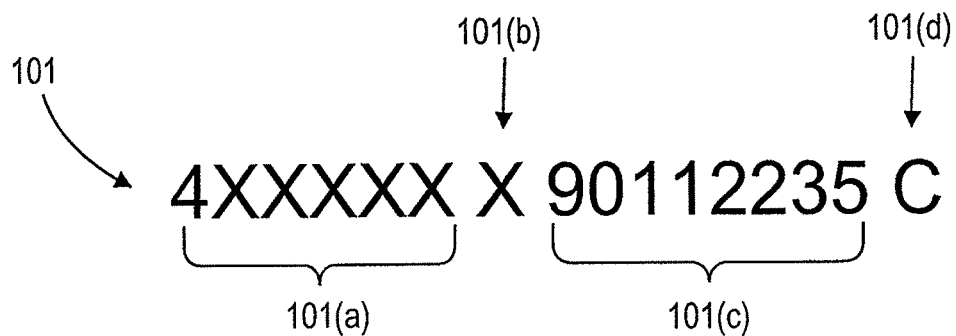
FIG. 1A shows a personalized primary account number according to an embodiment of the invention.

The personalized PAN is associated with the body of the consumer device. For example, the personalized PAN may be stored in a memory in the body, printed on the body, or embossed on the body. The format of a personalized PAN depends upon how many digits and/or characters are in the personalized data that is to be embedded into the PAN. FIG. 1A shows a PAN 101 with an embedded 8 digit phone number according to one embodiment of the invention. As shown, the first 6 digits 101(a) comprise the BIN, the next digit 101(b) is a spare digit, the next 8 digits 101(c) comprise the phone number, and the last digit 101(d) is an auto-generated check digit which is a value derived from the previous digits in the PAN.

As used herein, a "body" may include a substrate, housing, or any other suitable mass of material. Typically, a body is made of molded plastic and may be in the form of a plastic sheet. In some embodiments, a body is simply a flat substrate that has the dimensions of a credit or debit card. The dimensions of a typical substrate may be less than about 4 by about 6 inches.

Figure 1B:
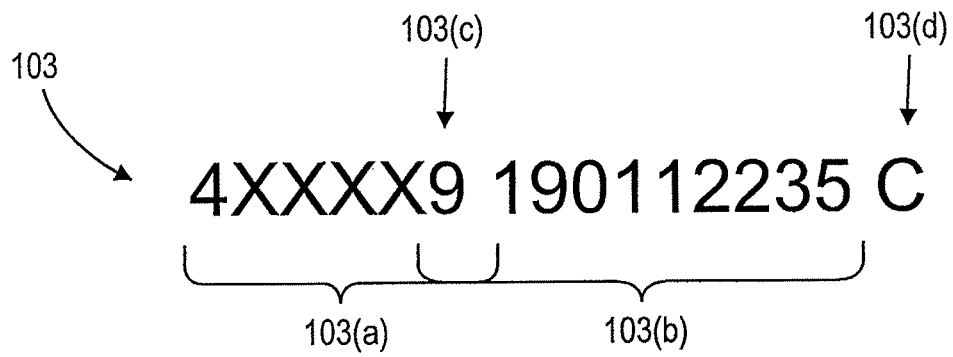
FIG. 1B shows a personalized primary account number according to an embodiment of the invention.

FIG. 1B shows a PAN 103 with an embedded 10 digit phone number according to one embodiment of the invention. As shown the first 6 digits 103(a) comprise the BIN which overlaps with the phone number—the last digit 103(c) of the BIN 103(a) is the first digit 103(c) of the phone number 103(b). The last digit 103(d) of the PAN 103 is an auto-generated check digit which is a value derived from the previous digits in the PAN. The BIN and phone number (or other type of number) may overlap by at least 1, 2, or even 3 (or more) digits. Overlap of the BIN and personalized data is advantageous because it creates more flexibility in the length of the personalized data and also leaves less digits and/or characters that the consumer has to remember (i.e., the consumer only has to remember the few digits of the BIN).

The following table outlines an exemplary numbering scheme capacity for a BIN depending on the length of the phone number. While these examples show a phone number overlapping with the BIN, it is understood that any other personalized number or data can also overlap with the BIN.

| Length of the Phone Number | Does the Issuer BIN Need to Have Specific Trailing Digit(s)? | Spare Digits | Max. Account Capacity |
|---|---|---|---|
| 8 | No, any BIN can support this scheme | 1 | 1 billion per BIN X total number of Issuer BINs |
| 10 | Yes, last BIN digit must correspond to the first digit of the phone number | 0 | 1 Billion per BIN X total number of Issuer BINS ending with a specific digit (say 9) |
| 12 | Yes, last 3 BIN digits must correspond to the first 3 digits of the phone number | 0 | 1 Billion per BIN X total number of Issuer BINS ending with specific 3 digit string |

Figure 1C:
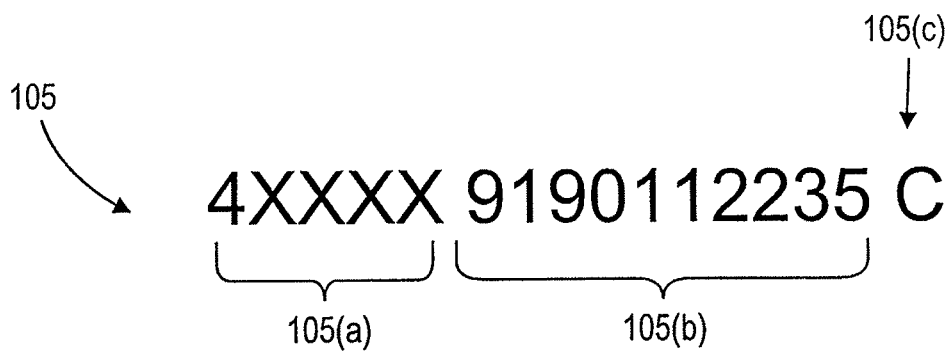
FIG. 1C shows a personalized primary account number according to an embodiment of the invention.

As shown in FIG. 1C, the only number the consumer has to remember is the short BIN 105(a) at the beginning of the PAN 105. The phone number 105(b) is known to the consumer and the last digit 105(c) will be provided for the consumer.

Figure 2A:
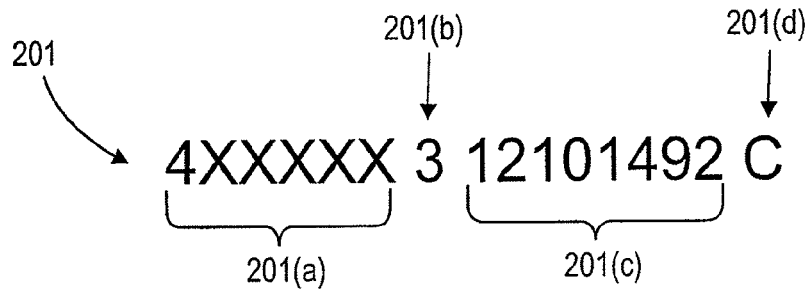
FIG. 2A shows a personalized primary account number according to an embodiment of the invention.

FIG. 2A shows a PAN with an embedded numeric date according to one embodiment of the invention. The PAN 201 in FIG. 2A includes several parts. The first six digits 201(a) make up the BIN. The next digit 201(b) is a free digit which is available for any use by the issuing bank. The next few digits 201(c) make up the numeric date. The final digit 201(d) is the check digit which is a value derived from the previous digits in the PAN.

Figure 2B:
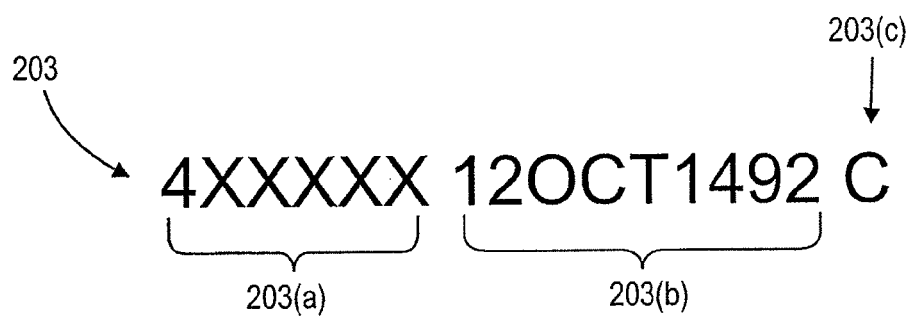
FIG. 2B shows a personalized primary account number according to an embodiment of the invention.

FIG. 2B shows a PAN with an embedded alpha-numeric date according to one embodiment of the invention. The PAN 203 in FIG. 2B includes several parts. The first six digits 203(a) make up the BIN. The next few digits and characters 203(b) make up the alpha-numeric date. The final digit 203(c) is the check digit which is a value derived from the previous digits in the PAN.

Figure 2C:
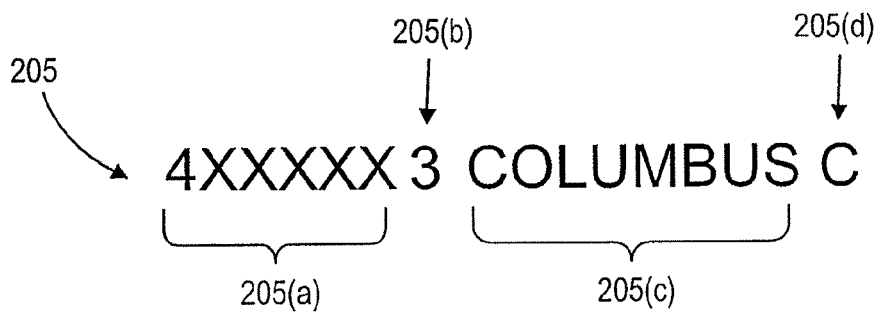
FIG. 2C shows a personalized primary account number according to an embodiment of the invention.

FIG. 2C shows a PAN with an embedded alpha-string according to one embodiment of the invention. The PAN 205 in FIG. 2C includes several parts. The first six digits 205(a) make up the BIN. The next digit 205(b) is a free digit which is available for any use by the issuing bank. The next few characters 205(c) make up the alpha-string. The final digit 205(d) is the check digit which is a value derived from the previous digits in the PAN.

Figure 2D:
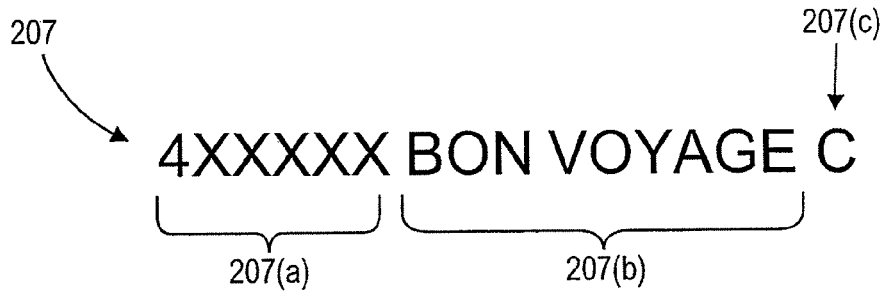
FIG. 2D shows a personalized primary account number according to an embodiment of the invention.

FIG. 2D shows a PAN with an embedded alpha-string according to one embodiment of the invention. The PAN 207 in FIG. 2D includes several parts. The first six digits 207(a) make up the BIN. The next characters 207(b) make up the alpha-string. The final digit 207(c) is the check digit which is a value derived from the previous digits in the PAN.

Figure 3A:
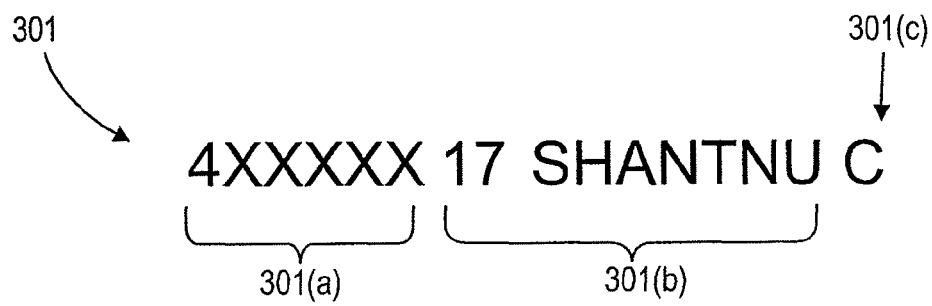
FIG. 3A shows a personalized primary account number according to an embodiment of the invention.

FIG. 3A shows a PAN 301 with an embedded type-length-value element (TLV) 301(b). The first six digits 301(a) make up the BIN and the last digit 301(c) is the check digit which is a value derived from the previous digits in the PAN. The middle digits and characters 301(b) make up the TLV. The TLV is useful to identify the nature of the personalization embedded in the PAN (e.g., whether the personalization is a date of birth, national ID, cardholder's name, etc.). The actual personalized data "SHANTNU" is preceded by two digits "17" that give the type and length of the personalized data "SHANTNU." Standard values are assigned for the type field to denote the data type. For example, a "1" may denote a name, a "2" may denote a date of birth, etc. The length field "7" give the actual length of the data included within the PAN. Thus, in this example, "17" denotes that the personalized data is a name that is 7 characters in length with the value "SHANTNU." The TLV is subject to available characters within the PAN.

Figure 3B:
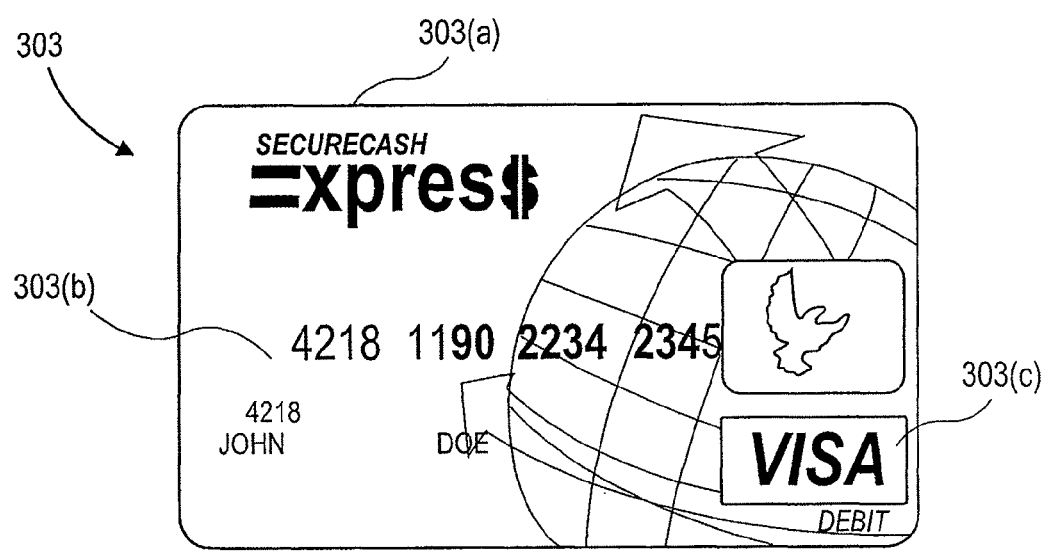
FIG. 3B shows a personalized primary account number according to an embodiment of the invention.

FIG. 3B shows an exemplary debit card 303 with a mobile phone number embedded into the PAN 303(b) according to one embodiment of the invention. The debit card 303 may have a logo 303(c) associated with the issuer of the card, and a logo 303(a) of an entity associated with the card. As shown, a 9 digit phone number fits nicely into a 16-digit PAN.

Figure 4A:
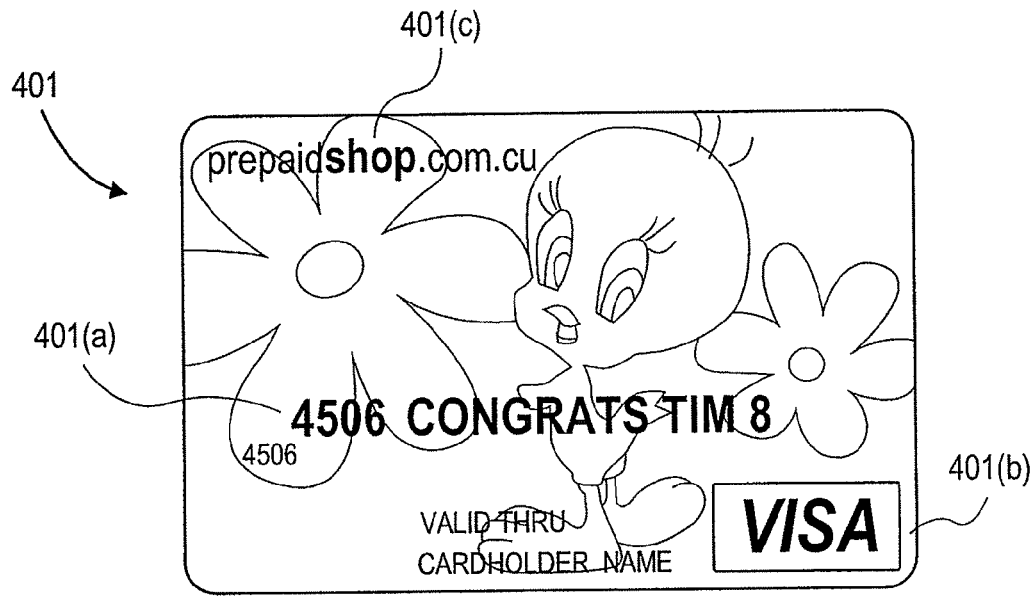
FIG. 4A shows a personalized primary account number according to an embodiment of the invention.

FIG. 4A shows an exemplary gift card 401 (e.g., stored value card) with a short message embedded into the PAN 401(a). The gift card 401 may have a logo 401(b) associated with the issuer of the card and a logo 401(c) associated with a merchant.

Figure 4B:
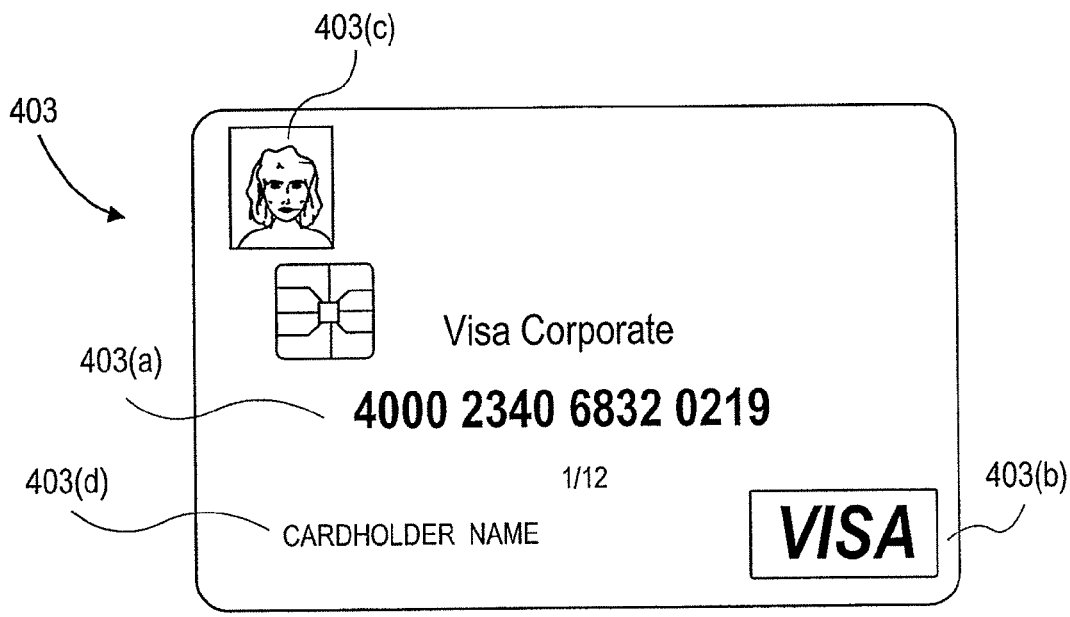
FIG. 4B shows a personalized primary account number according to an embodiment of the invention.

FIG. 4B shows an exemplary corporate card 403 with an employee ID embedded into the PAN 403(a). The corporate card 403 may have a logo 403(b) associated with the issuer of the card, a photo 403(c) of the employee, and the employee's name 403(d).

The following table outlines the available characters within a standard PAN for personalized consumer data based on various scenarios. Note that space constraints can also be addressed by allowing deployment of compression and decompression algorithms which will provide additional versatility in the use of various types of data in a PAN.

|  | Fixed BIN | TLV + Check Digit | Available Space | Smaller BIN | TLV + Check Digit | Available Space |
|---|---|---|---|---|---|---|
| With TLV | 6 | 3 | 7 | 4-5 | 3 | 8-9 |
| Without TLV | 6 | 1 | 9 | 4-5 | 1 | 11-12 |

Figure 5:
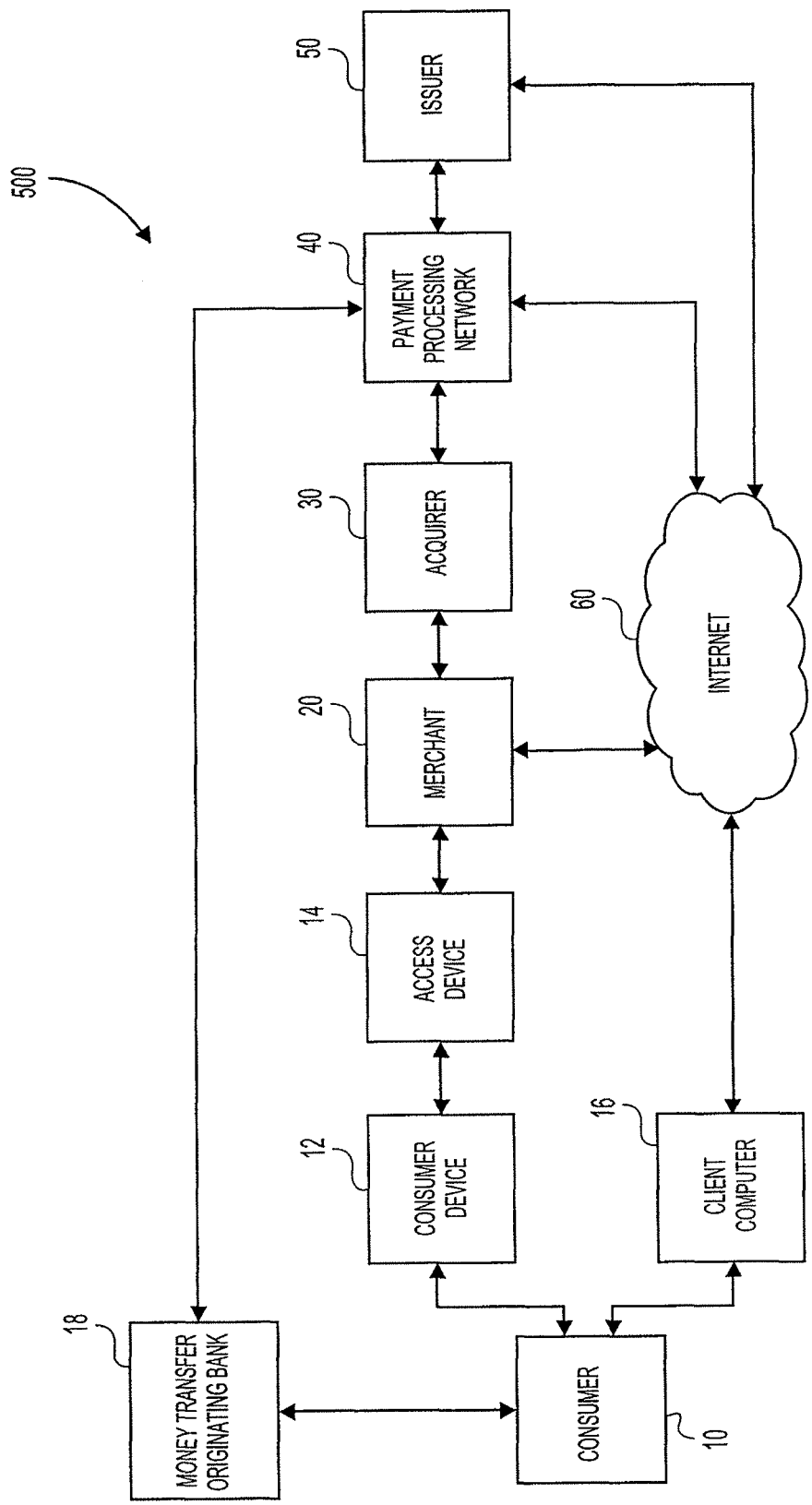
FIG. 5 shows a block diagram of a system according to an embodiment of the invention.

FIG. 5 shows a system 500 that can be used for conducting a payment transaction. For simplicity of illustration, one consumer, one consumer device, one client computer, one access device, one merchant, one acquirer, and one issuer are shown. It is understood, however, that embodiments of the invention may include multiple consumers, consumer devices, client computers, access devices, merchants, acquirers, and issuers. In additional, some embodiments of the invention may include fewer than all of the components shown in FIG. 5. Also, the components in FIG. 5 may communicate via any suitable communication medium (including the Internet 60), using any suitable communication protocol.

The system 500 includes a consumer 10 which may be an individual, or an organization such as a business that is capable of purchasing goods or services. The consumer 10 may operate a client computer 16. The client computer 16 can be a desktop computer, a laptop computer, a wireless phone, a personal digital assistant (PDA), etc. It may operate using any suitable operating system including a Windows™ based operating system. The client computer may be used to interact with a merchant 20 (e.g., via a merchant website).

The consumer device 12 may be in any suitable form as described above.

The merchant 20 may be an individual or an organization such as a business that is capable of providing goods and services. The merchant 20 may have a computer apparatus (not shown). The computer apparatus may comprise a processor and a computer readable medium. The computer readable medium may comprise code or instructions for receiving transaction information from a consumer 10, a consumer device 12 or a client computer 16, sending a payment request message, receiving a payment response message and providing an authorization response message to a consumer 10.

The merchant 20 may have one or more access devices 14. Suitable access devices include interfaces and may include point of sale (POS) devices, cellular phones, PDAs, personal computers (PCs), tablet PCs, handheld specialized readers, set-top boxes, electronic cash registers (ECR), automated teller machines (ATM), virtual cash registers (VCR), kiosks, security systems, access systems, and the like. They can interact with consumer devices. For example, a consumer 10 using a credit card to purchase a good or service can swipe it through an appropriate slot in the POS terminal. Alternatively the POS terminal may be a contactless reader, and the consumer device 12 may be a contactless device such as a contactless card. As another alternative, a consumer 10 may purchase a good or service via a merchant's website where the consumer enters the credit card information into the client computer 16 and clicks on a button to complete the purchase. The client computer 16 may be considered an access device.

The system 500 also includes an acquirer 30 associated with the merchant 20. The acquirer 30 may be in operative communication with an issuer 50 of the consumer device 12 via a payment processing network 40. The acquirer 30 is typically a bank that has a merchant account. The issuer 50 may also be a bank, but could also be a business entity such as a retail store or a mobile phone or telecommunications company. Some entities are both acquirers and issuers, and embodiments of the invention include such entities. The acquirer 30 and the issuer 50 may each have a server computer and a database associated with the server computer (not shown).

The system 500 also includes a money transfer originating bank 18 that provides a money transfer service such as Visa Money Transfer (VMT). The money transfer originating bank 18 may be a bank and could also be an acquirer, and issuer, or both.

The payment processing network 40 is located between (in an operational sense) the acquirer 30 and the issuer 50. It may include data processing subsystems, networks, and operations used to support and deliver authorization services, exception file services, and clearing and settlement services. For example, a payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 40 may use any suitable wired or wireless network, including the Internet 60. The payment processing network 40 may have a server computer and a database associated with the server computer (not shown). The server computer may comprise a processor and a computer readable medium. The computer readable medium may comprise code or instructions for receiving an authorization request message that contains a personalized primary account number, determining whether the personalized primary account number contains alpha-numeric values, and converting the alpha-numeric values to numeric values if the primary account number contains alpha numeric values. The computer readable medium may further comprise code or instructions for receiving a request for a personalized number associated with an account, determining whether the personalized primary account number is available to be associated with the account, and approving the personalized primary account number if the personalized account number is available to be associated with the account.

Figure 6:
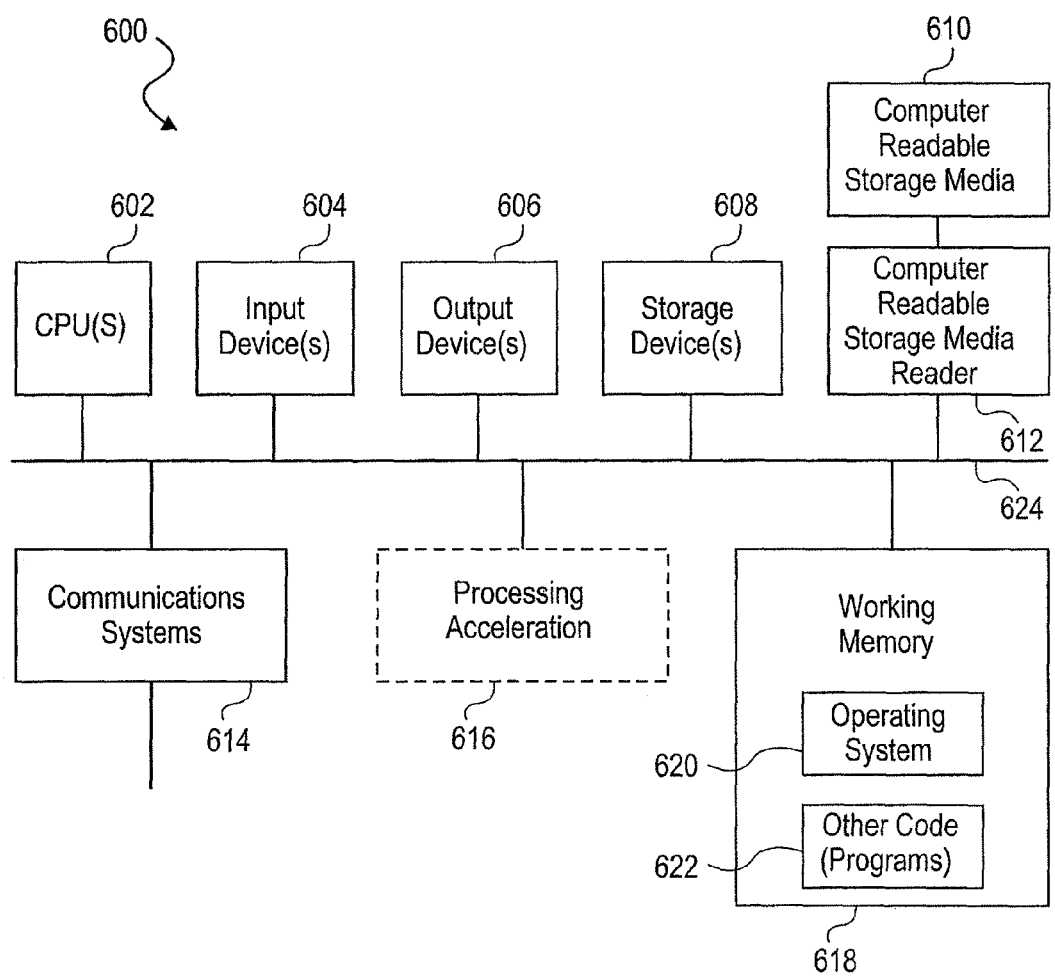
FIG. 6 shows a block diagram of an exemplary computer system.

FIG. 6 illustrates an exemplary computer system 600, in which various embodiments may be implemented. The system 600 may be used to implement any of the computer systems described above (e.g., client computer 16, a server computer at the payment processing network 40, a server computer at the issuer 50, a computer apparatus at the merchant 20, etc.). The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

According to one embodiment of the invention, a consumer 10 may request from an issuer 50, a new consumer device (e.g., new card or virtual account) or request to change the account number for an existing consumer device. The consumer 10 may make such a request via an issuer's website, by calling the issuer 50, or through other means. If the consumer 10 desires a personalized PAN, he would request specific personalized data be included in the PAN (e.g., his phone number, a short message, etc.). The issuer 50 would receive the request and then determine whether the personalized PAN is available to be associated with the account (e.g., whether another consumer is already using the account number, etc.). If the personalized PAN is not available, the issuer 50 would let the consumer 10 know that the personalized PAN is not available and may ask the consumer 10 if he would like to request a different personalized PAN or the issuer 50 may provide options for available personalized PANs. If the personalized PAN is available, the issuer 50 would approve the personalized PAN and deliver the account number to the consumer 10. If a consumer device 12 stores the PAN, the consumer 10 could use the consumer device 12 just like a regular credit card, debit card, or prepaid card if it is in the form of a card. The consumer 10 could also transfer money to and from the consumer device 12 if the consumer device 12 is capable of storing value.

Alternatively, when a consumer 10 is applying for a new consumer device 12 (e.g., online, phone), after the consumer 10 finished filling out or supplying his personal information, the issuer 50 can provide personalized PAN options. For example, the issuer 50 can suggest a PAN with the consumer's name or data of birth embedded in the PAN. Then the consumer 10 can chose one of the options provided by the issuer 50 or create his own personalized PAN.

Figure 7:
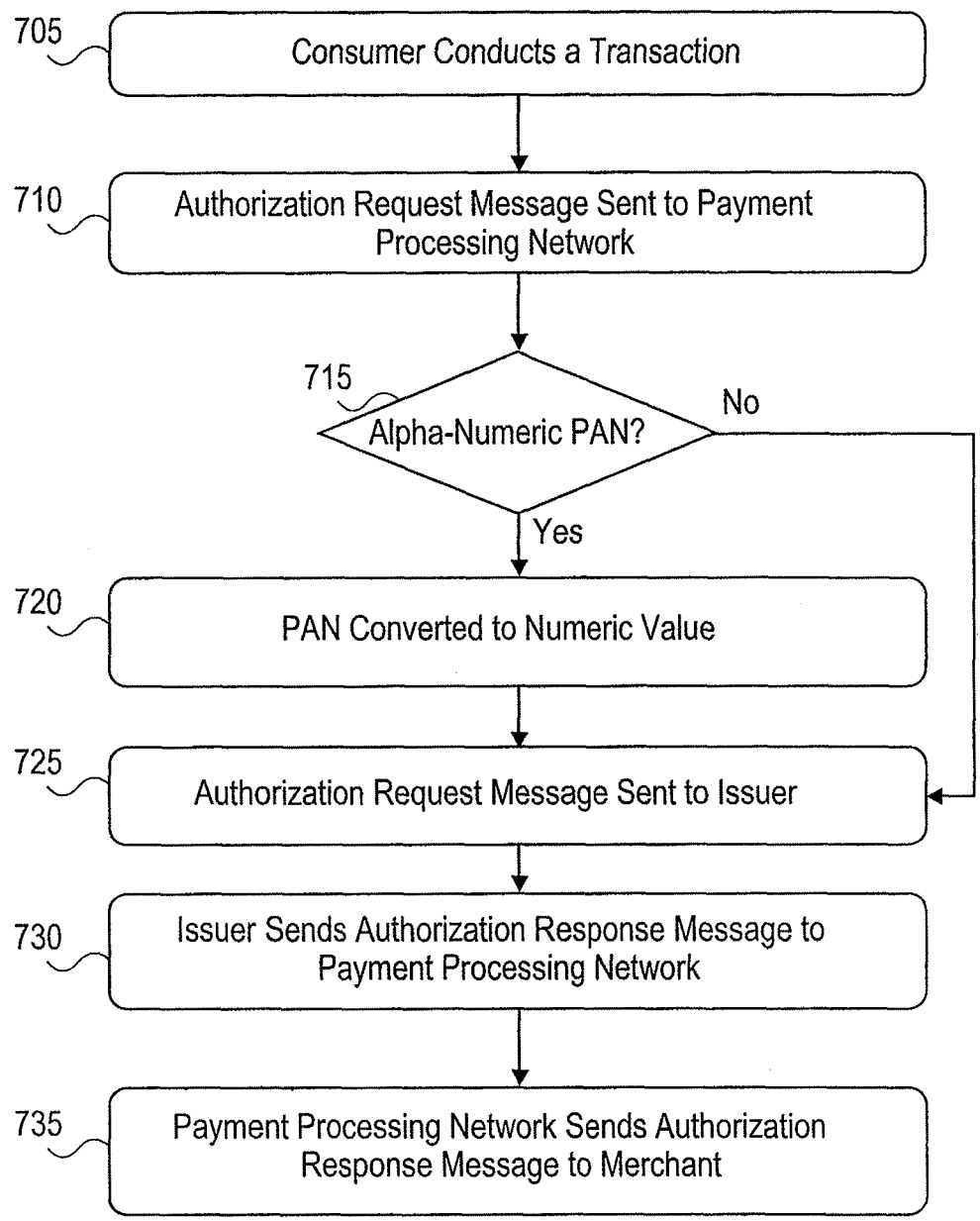
FIG. 7 shows a flowchart illustrating steps in a method according to an embodiment of the invention.

FIG. 7 shows a flowchart including a general method according to an embodiment of the invention. The method can be described with reference to the block diagrams in FIG. 5.

In a typical payment transaction, the consumer 10 conducts a transaction (step 705) by purchasing a good or service at the merchant 20 using a consumer device 12 (e.g., credit card). The consumer's consumer device 12 can interact with an access device 14 such as a POS (point of sale) terminal at the merchant 20. For example, the consumer 10 may take a credit card and may swipe it through an appropriate slot in the POS terminal. Alternatively, the POS terminal may be a contactless reader, and the consumer device 12 may be a contactless device such as a contactless card or a mobile phone with a contactless element. The consumer can also conduct a transaction using a client computer 16 via the Internet 60.

An authorization request message is generated by the access device 14 and is then sent to the payment processing network 40 (step 710) (which may be sent via the acquirer 30). The authorization message includes a PAN. Some payment processing networks, acquirers, issuers, merchants, or other entities may only be able to process a numeric PAN. If an entity can only process a numeric PAN, a PAN containing alpha and alpha-numeric data must be converted to numeric data. This conversion can be done at any point in the system (e.g., at the merchant, acquirer, payment processing network, issuer, at a special conversion point in between these entities, etc.). In the present embodiment, the payment processing network 40 determines whether the PAN is an alpha-numeric PAN or a numeric PAN (step 715). If the PAN is a numeric pan (or if there is no need for conversion because all of the entities in the system can process alpha-numeric data), the process continues to step 725.

If the PAN is an alpha-numeric PAN, the payment processing network 40 converts the PAN to a numeric value (step 720). The conversion can be done using any suitable method or algorithm or by using a proprietary method or algorithm. For example, the conversion could be done using look-up tables where numbers are mapped against alphabets or strings of data. This allows for a simple conversion of data with minimum complexity. A conversion algorithm can be used (either a public or proprietary algorithm) to convert the numbers to alphabets and vice versa. Also, compression algorithms (either public or proprietary algorithms) can be used that allow compression of data strings to shorter lengths and vice versa. Compression algorithms would facilitate personalizing more data than allowed by standard PAN length.

Next, an authorization request message is sent to the issuer 50 (step 725) of the consumer device 12. After the issuer 50 receives the authorization request message, the issuer 50 sends an authorization response message back to the payment processing network 40 (step 730) to indicate whether or not the current transaction is authorized. The payment processing network 40 then forwards the authorization response message back to the merchant 20 (which may be sent via the acquirer 30) (step 735). As mentioned above, a conversion for alpha or alpha-numeric data to numeric data and vice versa may occur at various stages in the process.

After the merchant 20 receives the authorization response message, the access device at the merchant 20 may then provide the authorization response message for the consumer 10. The response message may be displayed by the POS terminal, the consumer device 12, a client computer 16, or may be printed out on a receipt.

At the end of the day, a normal clearing and settlement process can be conducted by the payment processing network 40. A clearing process is a process of exchanging financial details between an acquirer and an issuer to facilitate posting to a consumer's account and reconciliation of the consumer's settlement position. Clearing and settlement can occur simultaneously.

A consumer may use a personalized PAN to conduct other types of transactions such as a money transfer from one account to the consumer device associated with such a PAN. For example, a telecommunications company such as a mobile phone company (e.g., an issuer 50) may deliver a consumer device 12 (e.g., prepaid card or virtual account that is either self-issued or co-branded with a bank) to a consumer 10 (e.g., those of its subscribers that are also remittance beneficiaries). The consumer 10 can add value to that consumer device 12 using a money transfer service such as Visa Money Transfer (VMT). For example, a consumer 10 may want to add value to an account associated with a mobile phone. The account associated with the mobile phone may have a personalized PAN with a phone number embedded in the PAN. The consumer 10 may be adding value to his own mobile phone or may want to add value to his teenage son's mobile phone. Since he knows his own mobile phone number or his teenage son's mobile phone number, he just needs to remember the BIN number to make the transfer.

To add value to the account using a money transfer service such as VMT, the consumer 10 contacts the money transfer originating bank 18 (e.g., online via the Internet and the originating bank's website, by calling the originating bank, in writing, or other means). The originating bank 18 then sends the VMT transaction through a payment processing network 40 such as VisaNet. The payment processing network 40 sends the VMT transaction to the issuer 50 (e.g., telecommunications company or bank) and the transfer is made to the consumer device 12, thus adding value to the consumer device 12 (e.g., recipient's Visa card/virtual account).

Embodiments of this invention provide many benefits. For consumers it provides an easy to recall PAN that is personalized to match their phone number, anniversary date, short message, etc. It also gives consumers an opportunity to associate something unique and personal to them with the consumer device. An issuer can potentially gain premium fee revenue per account for the personalized PAN and gain consumer loyalty. A consumer may also use his consumer device that has a personalized PAN more frequently than his other consumer devices.

In the case where an issuer is an telecommunications company such as a mobile phone company, the company can gain greater loyalty among its customers by providing them with a PAN with their embedded mobile phone number (for example) and enable more frequent and regular use for those customers who have a prepaid mobile card account. Mobile numbers issued by the telecommunications company are a core part of a money transfer solution. Due to regulatory requirements, card issuance and actual money transfer may still need to involve banks and financial institutions, but telecommunications companies want to play a larger role than that of a "communications pipe"—hence a need for a mobilecentered solution. Un-carded customers are much more familiar with their mobile numbers (or other personalized data) than with a Visa card or Visa account number, for example. Further, a payment processing organization (e.g., Visa, MasterCard, Discovery Card, etc.) can partner with a telecommunications company and reach un-carded segments and leverage marketing, technology and customer relationship assets that telecommunications companies bring. This type of partnership can provide domestic and cross-border money transfer solutions.

As describe above, embodiments of this invention also provide mechanisms to allow for more flexibility in the type and length of personalized data to be embedded in a PAN. For example, the BIN and the personalized data may overlap. Overlap of the BIN and personalized data is advantageous because it creates more flexibility in the length of the personalized data and also leaves less digits and/or characters that the consumer has to remember (i.e., the consumer only has to remember the few digits of the BIN).

Also, a TLV element can be embedded in the PAN. The TLV is useful to identify the nature of the personalization embedded in the PAN (e.g., whether the personalization is a date of birth, national ID, cardholder's name, etc.). The TLV is also very useful for authentication and for risk mitigation. For example, when the payment processing network or issuer receives an authorization message from a merchant, it can check the TLV to determine what data is included in the personalized data and then can match that data against different security elements for authentication. Another example is where a transaction may be deemed risky (e.g., payment attempt for a large ticket item such as a big screen TV) and at the POS the merchant can cross-check the information by asking for the consumer's personal information and comparing with what is on the card.

Further, space constraints can also be addressed by allowing deployment of compression and decompression algorithms which will provide additional versatility in the use of various types of data in a PAN. Compression algorithms allow compression of data strings to short lengths and vice versa.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, at a server computer, a request for a personalized primary account number associated with an account that includes personalized data to be embedded into a primary account number;
   determining, by the server computer, whether the personalized primary account number is available to be associated with an account;
   based on the determination that the personalized primary account number is available to be associated with an account, creating, by the server computer, the personalized primary account number with a bank identification number that overlaps with the personalized data;
   approving, by the server computer, the personalized primary account number that includes the bank identification number that overlaps the personalized data; and
   delivering the personalized primary account number to a consumer.

2. The method of claim 1 wherein the personalized data is a phone number, date, name, short message, zip code, national service number, address, a word translated into numbers, an employee identification number, a government identification number, a social security number, or a tax file number.

3. The method of claim 1 wherein the account is associated with a credit card, debit card, or stored value card.

4. A non-transitory computer readable medium comprising:
   computer readable program code embodied therein, said computer readable program code adapted to be executed by a processor to implement the method of claim 1.

5. A server computer comprising the processor; and the non-transitory computer readable medium of claim 4 coupled to the processor.

6. A method comprising:
   receiving, at a server computer, a request for a personalized primary account number associated with an account that includes personalized data to be embedded into a primary account number;
   determining, by the server computer, whether the personalized primary account number is available to be associated with an account; and
   based on the determination that the personalized primary account number is available to be associated with an account, creating, by the server computer, the personalized primary account number with the personalized data and a type-length-value element; and
   approving, by the server computer, the personalized primary account number that includes the personalized data and the type-length-value element.

7. The method of claim 6 wherein the type-length-value element includes a type field wherein the type field is a value denoting a personalized data type.

8. The method of claim 6 wherein the type-length-value element includes a length field wherein the length field is the length of the personalized data embedded into the primary account number.

9. A non-transitory computer readable medium comprising:

computer readable program code embodied therein, said computer readable program code adapted to be executed by a processor to implement the method of claim 6.

10. A server computer comprising the processor; and the non-transitory computer readable medium of claim 9 coupled to the processor.

11. The method of claim 7 wherein the personalize data type denoted by the type field is a phone number, date, name, short message, zip code, national service number, address, a word translated into numbers, an employee identification number, a government identification number, a social security number, or a tax file number.

12. A method comprising:

receiving, at a server computer, an authorization request message that contains a personalized primary account number comprising a bank identification number that overlaps personalized data;

determining, by the server computer, whether the personalized primary account number contains alpha-numeric values; and converting, by the server computer, the alpha-numeric values in the personalized account number to numeric values if the personalized primary account number contains alpha-numeric values.

13. A non-transitory computer readable medium comprising:

computer readable program code embodied therein, said computer readable program code adapted to be executed by a processor to implement the method of claim 12.

14. A server computer comprising the processor; and the non-transitory computer readable medium of claim 13 coupled to the processor.

15. The method of claim 12 wherein the personalized primary account number further c omprises a type length value element.

16. The method of claim 12 further comprising:

sending, by the server computer, the authorization request message including the numeric values to an issuer associated with the bank identification number receiving, by the server computer, an authorization response message from the issuer.

* * * * *